(12) United States Patent
Saxena et al.

(10) Patent No.: US 11,824,707 B1
(45) Date of Patent: Nov. 21, 2023

(54) DETERMINING A RESILIENT PORTION OF AN INTERNET-BASED NETWORK

(71) Applicant: International Business Machines Corporation, Armonk, NY (US)

(72) Inventors: Rajesh Kumar Saxena, Thane East (IN); Harish Bharti, Pune (IN); Anupam Gupta, Noida (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/878,730

(22) Filed: Aug. 1, 2022

(51) Int. Cl.
*H04L 41/0803* (2022.01)
*H04L 43/50* (2022.01)

(52) U.S. Cl.
CPC .......... *H04L 41/0803* (2013.01); *H04L 43/50* (2013.01)

(58) Field of Classification Search
CPC ..... H04L 41/0803; H04L 43/50; H04L 45/12; G16Y 40/30; G16Y 10/75
See application file for complete search history.

(56) References Cited

U.S. PATENT DOCUMENTS

| | | | | |
|---|---|---|---|---|
| 2010/0332991 | A1* | 12/2010 | Banerjee | H04L 41/12 709/224 |
| 2017/0149792 | A1* | 5/2017 | Smith | H04L 9/3263 |
| 2018/0121805 | A1* | 5/2018 | Stone | G06F 18/241 |
| 2021/0064783 | A1* | 3/2021 | Jain | G11C 7/1012 |
| 2021/0176036 | A1* | 6/2021 | Gulati | H04L 9/0825 |

FOREIGN PATENT DOCUMENTS

KR 102047848 B1 11/2019

OTHER PUBLICATIONS

O'Keefe et al., "Frontier: Resilient Edge Processing for the Internet of Things," Proceedings of the VLDB Endowment, vol. 11, No. 10, 2018, pp. 1178-1191.
Al-Shammari et al., "Resilient Service Embedding in IoT Networks," IEEE Access, vol. 8, 2020, pp. 123571-123584.
Rashid et al., "Toward ResilientWireless Sensor Networks: A Virtualized Perspective," Sensors, vol. 20, 2020, pp. 1-20.

* cited by examiner

*Primary Examiner* — Tonia L Dollinger
*Assistant Examiner* — Mehulkumar J Shah
(74) *Attorney, Agent, or Firm* — Zilka-Kotab, P.C.

(57) ABSTRACT

A computer-implemented method according to one embodiment includes defining a network resilience construct of an internet-based network. The network resilience construct includes rankings for nodes of the internet-based network. The nodes of the internet-based network are manipulated to determine an Activated Core Affluence (ACA) of the internet-based network, and the ACA defines a likelihood, for each node, of retaining the ranking for the node upon a first group of the nodes losing connection with the internet-based network. The method further includes determining, based on the ACA, a resilient portion of the network that includes an activated core of the nodes. The nodes of the activated core retain connection with one or more other nodes of the internet-based network upon the first group of the nodes losing connection.

19 Claims, 9 Drawing Sheets

DETERMINING A RESILIENT PORTION OF AN INTERNET-BASED NETWORK

BACKGROUND

The present invention relates to internet-based networks, and more specifically, this invention relates to a resiliency of nodes of an internet-based network that includes an activated core of nodes.

In the current era of the Internet of Things (IoT), an array of devices and sensors are often used to form an internet-based network, e.g., a machine to machine network, to achieve a utility. For example, a first device, such as a computer, may communicate with a second device, such as a printer, to enable data from the computer to be printed. Communication between the first device and the second device may be conducted over one or more communication paths that each have a plurality of nodes that may be hopped between to establish the connection. For example, communication may be output from the first device, transmitted along at least a first plurality of nodes, and received by the second device. An acknowledgement of receipt of the communication may be output from the second device, transmitted along the first plurality of nodes and/or a second plurality of nodes, and be received by the first device.

SUMMARY

A computer-implemented method according to one embodiment includes defining a network resilience construct of an internet-based network. The network resilience construct includes rankings for nodes of the internet-based network. The nodes of the internet-based network are manipulated to determine an Activated Core Affluence (ACA) of the internet-based network, and the ACA defines a likelihood, for each node, of retaining the ranking for the node upon a first group of the nodes losing connection with the internet-based network. The method further includes determining, based on the ACA, a resilient portion of the network that includes an activated core of the nodes. The nodes of the activated core retain connection with one or more other nodes of the internet-based network upon the first group of the nodes losing connection.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a resilient portion of an internet-based network.

In one general embodiment, a computer-implemented method includes defining a network resilience construct of an internet-based network. The network resilience construct includes rankings for nodes of the internet-based network. The nodes of the internet-based network are manipulated to determine an Activated Core Affluence (ACA) of the internet-based network, and the ACA defines a likelihood, for each node, of retaining the ranking for the node upon a first group of the nodes losing connection with the internet-based network. The method further includes determining, based on the ACA, a resilient portion of the network that includes an activated core of the nodes. The nodes of the activated core retain connection with one or more other nodes of the internet-based network upon the first group of the nodes losing connection.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
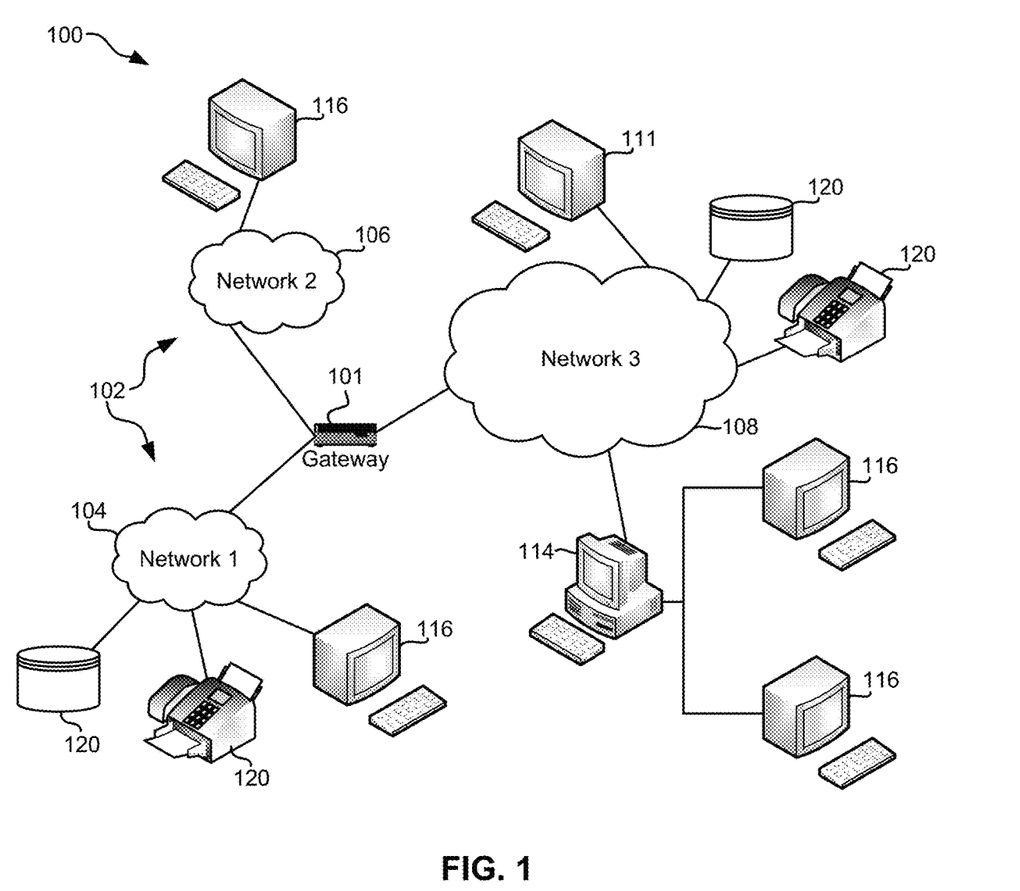
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
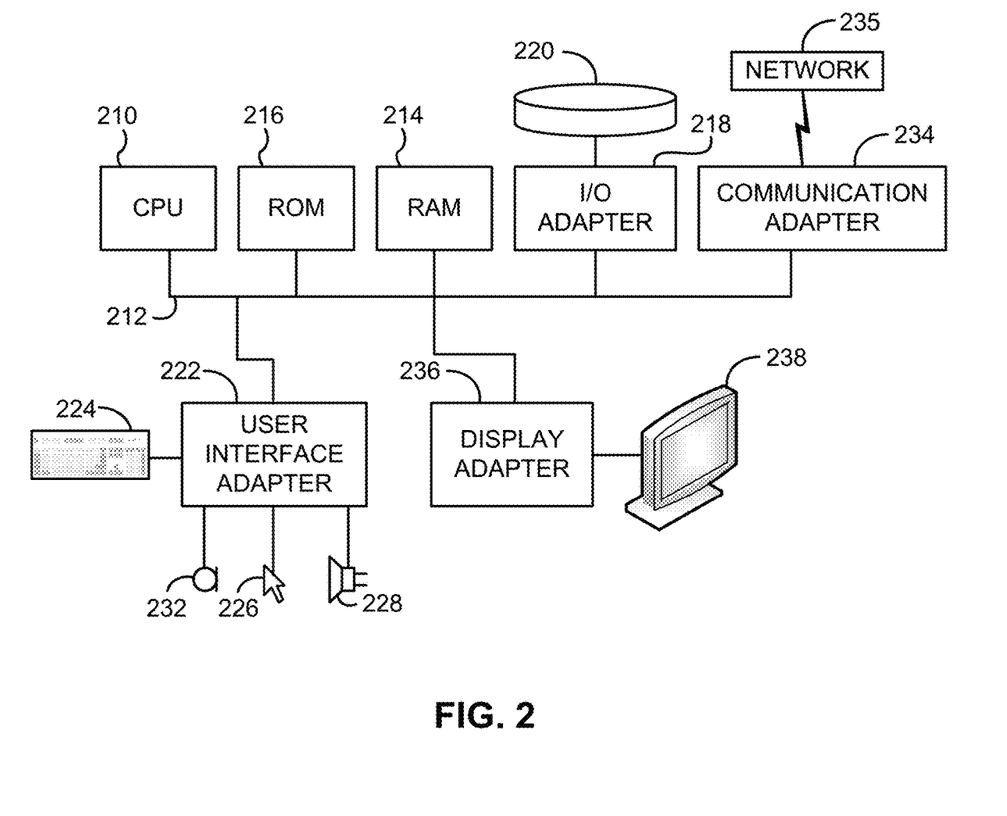
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere above, in the current era of the Internet of Things (IoT), an array of devices and sensors are often used to form an IoT Network, e.g., a machine to machine network, to achieve a utility. For example, a first device, such as a computer, may communicate with a second device, such as a printer, to enable data from the computer to be printed. Communication between the first device and the second device may be conducted over one or more communication paths that each have a plurality of nodes that may be hopped between to establish the connection. For example, communication may be output from the first device, transmitted along at least a first plurality of nodes, and received by the second device. An acknowledgement of receipt of the communication may be output from the second device, transmitted along the first plurality of nodes and/or a second plurality of nodes, and be received by the first device.

A case may now be considered in which an internet-based network, e.g., an internet of things (IoT) network, has an activated core, e.g., a minimal number of nodes to achieve a utility, which is made up of non-obligatory participants. For context, a non-obligatory participant may be any node that is not obligated and therefore cannot be relied on to participate in a specific operation within the internet-based network. This saves overhead, but comes at the cost of reliability. Note however, that despite the non-obligatory participant not being obligated to participate in such an operation within the internet-based network, the non-obligatory participant may participate in the operation. For example, in the event that the non-obligatory participant is not preoccupied and/or is connected within the internet-based network when called to participate in the operation, the non-obligatory participant may participate in the operation, e.g., serve as a node in a communication path. One issue that occurs when one or more members of a "non-obligatory network" are non-confirmatory, is that the non-obligatory participants jeopardize a core functioning of the network. For context, a "non-confirmatory" node may be any node along a communication path of the internet-based network that is not ensured to be readily available at all times. For example, a communication path having a plurality of nodes may fail to deliver a communication transmission from a first device to a second device as a result of a non-confirmatory node not being available at a time that the communication transmission is output from the first device to the second device. This issue may be resolved by isolating the non-conforming nodes of network and can leverage only non-confirmatory, non-obligatory nodes to form an activated core. However, conventional techniques fail to provide a framework to obtain an activated core in an internet-based network with the presence of non-confirmatory nodes that is based on a network resilience construct and/or an activated core affluence (ACA).

In sharp contrast to the deficiency of the conventional techniques described above, various embodiments and approaches described herein enable an activated core in an internet-based network with the presence of non-confirmatory nodes. As will be described in greater detail elsewhere below, this enablement may be based on a network resilience construct and/or an activated core affluence (ACA). An activated core, which is made up of non-obligatory participants of the internet-based network and is part of the internet-based network, is sufficient in itself to obtain a utility. If any of the members of the internet-based network are non-confirmatory, an order of the network may be affected. Accordingly, a framework which enables an activated core in the internet-based network with the presence of non-confirmatory nodes is enabled in various of the embodiments and approaches described herein. This activated core in some approaches includes a number of nodes which are affluent enough to create what is known as a "non-obligatory trade path." In order to develop this framework that leads to non-obligatory activated core network in the presence of non-confirmatory nodes in the network, various of the embodiments and approaches described herein define a "network resilience construct" and an ACA. The network resilience construct is defined for an internet-based network with non-confirmatory nodes where every node is assigned with a core number ranking. Part of network is then randomly removed and an effect of this removal on the core number ranking of the nodes is determined. This determination can be used to establish a relationship, and the relationship may be used to determine the ACA. The ACA describes how likely a node is to retain its core number when the node loses connections. The ACA may be used to determine whether or not the network is resilient. Accordingly, the various embodiments and approaches described herein restore the loss of reliability described elsewhere above.

Figure 3A:
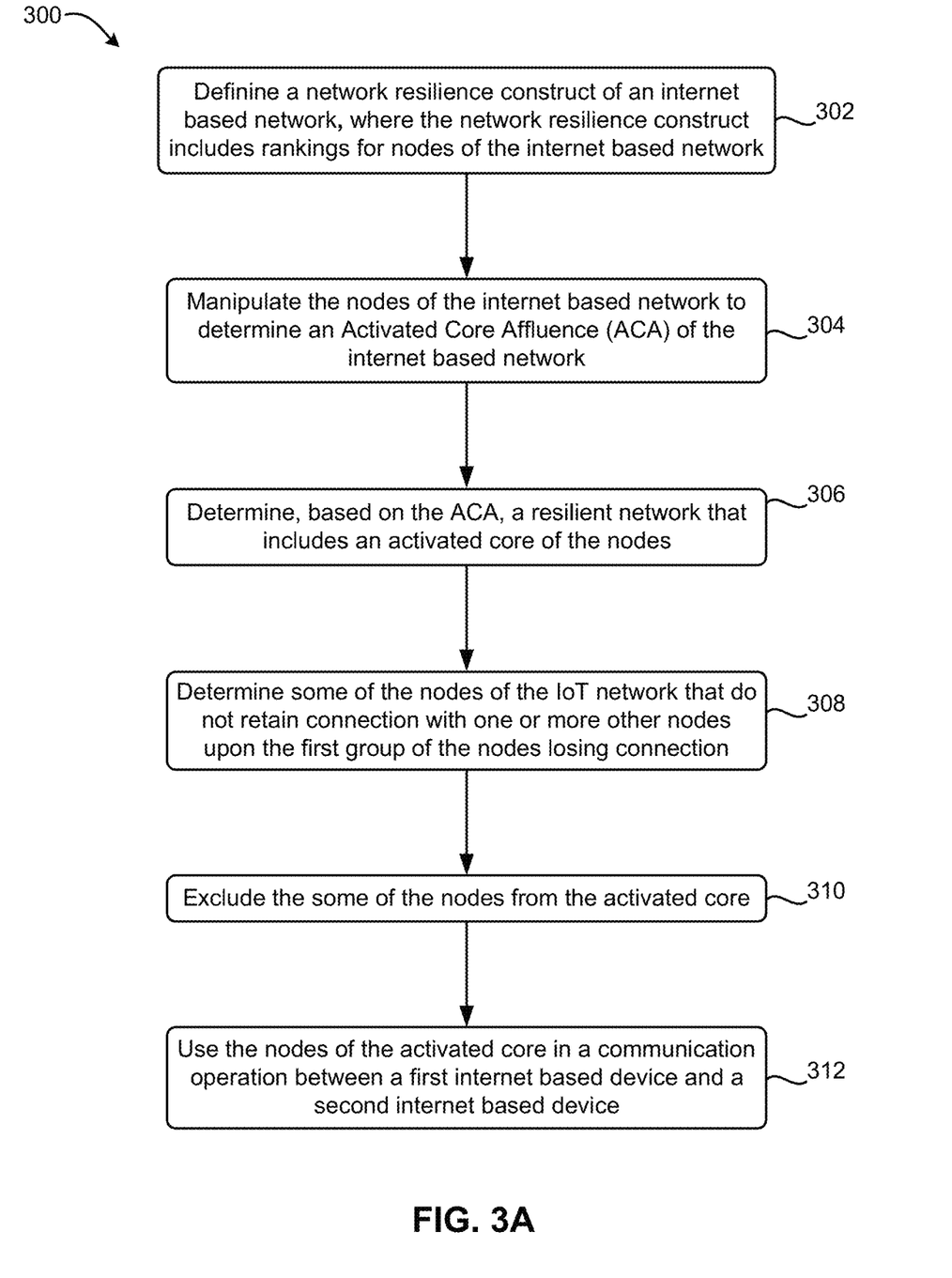
FIG. 3A is a flowchart of a method, in accordance with one embodiment.

Now referring to FIG. 3A, a flowchart of a method 300 is shown according to one embodiment. The method 300 may be performed in accordance with the present invention in any of the environments depicted in FIGS. 1-6B, among others, in various embodiments. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 includes defining a network resilience construct of an internet-based network. The internet-based network may in some approaches be an IoT network, a known type of internet network, etc. The internet-based network may additionally and/or alternatively include any number of devices, e.g., computer, processor, printer, router, signal repeater, wireless component, a fax machine, etc., that each have one or more communication paths with at least another one of the devices. Such communication paths may include one or more nodes, e.g., other devices of the internet-based network, that are hopped along by a communication transmission that is being sent from one of the devices to at least another one of the devices. Moreover, in some approaches the devices of the internet-based network are geospatially close to one another, e.g., within a predefined wireless range, within a predetermined number of hops, within a predetermined geographical distance from one another such as less than one mile, within near-band communication range, within the same building, within the same room, within the same wireless network, etc.

The nodes of the internet-based network may in some approaches be non-obligatory participants within the internet-based network. According to one illustrative approach, the internet-based network may include at least a first device, e.g., hereafter in this example "solar panel," and a second device, e.g., hereafter in this example "water sprinkler." It may be assumed that the solar panel includes a temperature sensor, and that in response to a determination by a processor of the solar panel that an environmental temperature of an environment that the solar panel and the water sprinkler are located in, exceeds a predetermined threshold, the processor of the solar panel is configured to attempt to output an instruction to a controller of the water sprinkler to cause the water sprinkler to switch on and/or off to water the lawn. In some approaches, the communication transmission between the solar panel and the water sprinkler is non-obligatory. This reduces overhead in the internet-based network, but comes at the cost of availability. For example, assuming that the water sprinkler should be turned on at 9:00 AM, the water sprinkler may end up being turned on at 9:05 AM based on non-obligatory nodes. The non-obligatory nodes include the water sprinkler, the solar panel, and other devices geo-spatially close to the solar panel and the water sprinkler that form a communication path between the solar panel and the water sprinklers. Based on the noes being non-obligatory nodes, one or more of the nodes may not be available to enable the communication at 9:00 AM, but thereafter may be available to enable the communication at 9:05 AM. Note that the non-obligatory nodes are used as the communication path in order to maintain a relatively low overhead. This comes at the cost of reliability because the non-obligatory nodes cannot be depended on to be available at all times, e.g., such as at 9:00 AM, and therefore the non-obligatory nodes do not themselves form a separate network of obligatory nodes.

In some approaches, defining the network resilience construct of the internet-based network includes assigning ranking to each of the nodes of the internet-based network. Accordingly, in such an approach, the network resilience construct includes rankings for nodes of the internet-based network. In some preferred approaches, the ranking assigned to a given node is based on a number of other nodes that the given node is connected to, e.g., a core number. For example, assuming that the internet-based network includes five nodes, a first of the nodes may be assigned a ranking of one in response to a determination that the first node is connected to one other of the five nodes, a second of the nodes may be assigned a ranking of three in response to a determination that the second node is connected to three of the five nodes, a third of the nodes may be assigned a ranking of four in response to a determination that the third node is connected to three of the five nodes, etc. Known techniques may be used to determine a number of nodes that a given node is connected to.

In some other approaches each of the ranks of the nodes are initially assigned the same value, e.g., one, ten, one-hundred, etc. In some other approaches, the nodes may be assigned different values, e.g., predetermined values according to device type, random values, one of two predetermined values at random, etc.

Operation 304 includes manipulating the nodes of the internet-based network to determine an Activated Core Affluence (ACA) of the internet-based network. For context, the ACA defines a likelihood, for each node, of retaining the ranking for the node upon a first group of the nodes at least temporarily losing connection with the internet-based network. During the at least temporary loss of connection between the first group of nodes and the internet-based network connection with the internet-based network a remainder of the nodes of the internet-based network may remain connected to the internet-based network. In some approaches, an at least temporary loss of connection may be established by at least temporarily masking part of the internet-based network from a remainder of the internet-based network. For example, looking to FIG. 3B, exemplary sub-operations of manipulating the nodes of the internet-based network to determine an ACA of the internet-based network are illustrated in accordance with one embodiment, one or more of which may be used to perform operation 304 of FIG. 3A. However, it should be noted that the sub-operations of FIG. 3B are illustrated in accordance with one embodiment which is in no way intended to limit the invention.

Figure 3B:
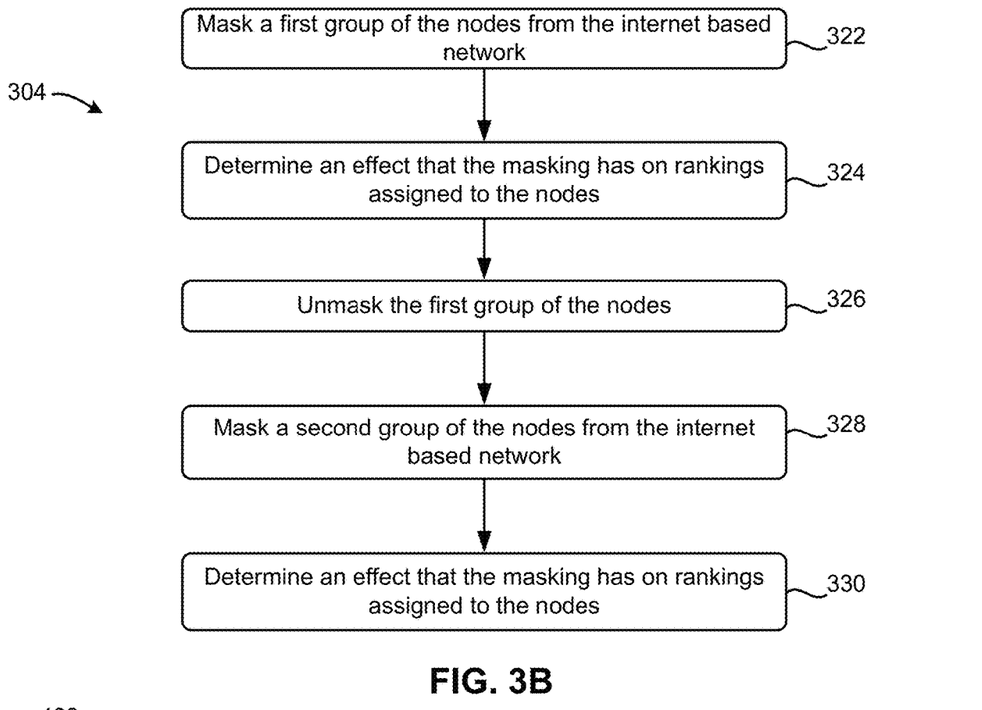
FIG. 3B is a flowchart of sub-operations of an operation of the flowchart of FIG. 3A.

As illustrated in FIG. 3B, in some approaches manipulating the nodes of the internet-based network to determine the ACA of the internet-based network may include masking a first group of the nodes from the internet-based network, e.g., see sub-operation 322. Groups of nodes, e.g., such as the first group of the nodes, may be randomly masked from the internet-based network during operation of the internet-based network in some approaches. An effect that the masking has on rankings assigned to the nodes is determined, e.g., see sub-operation 324. More specifically, an effect that the masking has on rankings assigned to a second group of nodes of the internet-based network that are not masked is determined in some approaches. For example, the effect that the masking of the first group of the nodes has on the second group of the nodes may include one or more losses of connection within the second group of nodes. This is because some connections, e.g., communication paths, that include nodes of the second group of nodes may rely on one or more nodes of the first group of nodes being present, e.g., not masked in the internet-based network. When masked however, these nodes of the first group of nodes are not present in the internet-based network, and therefore an effect of the masking may include one or more connections being at least temporarily lost. In some approaches, in response to a determination that a node loses connection, e.g., with at least one other device of the internet-based network, as a result of other nodes being masked in the internet-based network, a ranking of the node that loses one or more connections may be decreased a predetermined amount. Note that the second group of the nodes may be nodes that remain included in and not unmasked in the internet-based network while the first group of the nodes are masked in the internet network. Sub-operation 326 includes unmasking the first group of nodes, e.g., thereby returning the internet-based network to a state that existed prior to the masking of the first group of nodes. A second group of nodes may be masked from the internet-based network, e.g., see sub-operation 328. An effect that the masking of the second group of nodes has on rankings assigned to the nodes, e.g., other nodes of the internet-based network that are not masked with the second group of nodes, may be determined, e.g., see sub-operation 330. Techniques similar to those used in sub-operation 324 may be used to determine the effect that the masking of the second group of nodes has on rankings assigned to the nodes. The second group of nodes may optionally be unmasked, e.g., thereby returning the internet-based network to a state that existed prior to the masking of the second group of nodes.

With reference again to FIG. 3A, a resilient portion of the network that includes an activated core of the nodes may be determined based on the ACA, e.g., see operation 306. In some approaches, the activated core has a minimal utility driven topology that makes the internet-based network functional. In some preferred approaches, the nodes of the activated core retain connection with one or more other nodes of the internet-based network upon the first group and/or other group(s) of the nodes at least temporarily losing connection with the internet-based network. Accordingly, the activated core establishes a group of available nodes, e.g., more than one available node, that reliably allow communications to be performed between at least a first device, e.g., a source device, to at least a second device, e.g., a target device, along a confirmatory route. For example, in the example described elsewhere above, the activated core establishes a group of available nodes that reliably allow communications to be performed between the solar panel and the water sprinkler. In contrast, nodes of the internet-based network that do not retain connection with one or more other nodes of the internet-based network upon one or more groups of the nodes at least temporarily losing connection with the internet-based network, are in some approaches identified from the ACA and excluded from the activated core.

Illustrative approaches for defining the network resilience construct of the internet-based network and manipulating the nodes of the internet-based network to determine the ACA of the internet-based network will now be described below. Techniques of these illustrative approaches may be used in addition to and/or as alternative to various of the techniques described herein in various operations of method 300.

To define the network resilience construct it may be assumed that the internet-based network includes non-confirmatory nodes, and each node is assigned a ranking, e.g., a core number ranking. Part of network, e.g., a first group of the nodes, a second group of the nodes, a third group of the nodes, etc., may be randomly removed from the internet-based network, e.g., at least temporarily masked, and an effect of such removal may be checked on the rankings of the nodes. More specifically, a relationship may be established and can be used to determine whether the randomly removed part of the network includes nodes that are important for enabling maintained communication paths, e.g., the activated core nodes, and can fully function without the rest of the network nodes which include non-confirmatory nodes. According to a more specific approach, these concepts are explained below by defining a tiled graph "G" which may be conceptually equivalent to the internet-based network.

In some approaches, a metric of the ACA may be defined by assigning the rankings of the nodes, e.g., preferably based on a number of edges that each node is connected with, and then randomly removing a p % of edges or nodes of the internet-based network, e.g., see Equation (1) below. A metric for a resilient portion of the network, e.g., core resilience "91," may then be defined, e.g., see Equation (2) and Equation (3) below. An affluence of the whole internet-based network, which was previously obtained by removing the ρ % nodes from network may then be integrated, e.g., Equation (4) below. The ACA is also derived, which is a measure of how likely the activated ranking, e.g., core number, decreases when edges or a random percent, e.g., group, of nodes are masked from the network.

With reference again to the tiled graph "G," the randomly triangle tiled graph "G" may be created in which each individual node carries out a function being referred to as micro-operative. In some approaches, each individual node, e.g., see "u" and "v" in the Equations below, is assigned a micro-operative. These micro-operatives are operations in which nodes exchange predetermined types/amount of data. In some more specific approaches, the micro-operative may include one node manipulating data, e.g., multiplying a value of a first node, dividing data of a first node, etc., and determining at a second node if a result of the manipulated data is a correct value, e.g., an expected value. Based on these exchanges of data, it may be determined whether or not connections remain established between two nodes. For example, it may be determined that a connection is lost in response to a determination that an exchange of data between nodes fails. In contrast, it may be determined that a connection is not lost in response to a determination that an exchange of data between nodes is successful. In one approach, it may be determined that 'uv' exists as an edge, when both the nodes "u" and "v" share at least one micro-operative, e.g., a micro-operative exchange between the nodes is determined to be successful. Furthermore, 'n' nodes of the internet-based network are distributed uniformly, and are assumed to be on one side of the network. The variable "r" represents the communication impedance, e.g., the opposite of flow, which is reduced to one if every two nodes are able to communicate with each other. In one preferred approach, the tiled graph "G," e.g., which is unbiased based on the symmetric (r=1), includes the following properties:

$$G_{r,\theta,\mho}^n \left\{ \begin{array}{l} \mho_u \subseteq [\mho] \\ \mho_u \cap \mho_v \neq \theta \end{array} \right. \xrightarrow{symmetric\ (r=1)} G_{\theta,\mho}^n \qquad \text{Equation (1)}$$

Note that in Equation (1), the variable theta represents a zero set, e.g., {0}, and the variable mho, which is the inverse of omega, represents a node. The metric of ACA, of the network "G" as defined in Equation (1) may then be defined as a correlation between the rankings, e.g., core number rankings, of a top η % nodes, as ranked by the ranking (core number), before and after ρ % edges or nodes are removed at random. This enables the nodes that are not changing in ranking (retaining resilient connections) to remain on the top, while other nodes that have a changed ranking to switch to one or zero to thereby be excluded from an activated core of nodes. According to one approach, this may be defined using Equation (2) below.

$$R_\eta^\rho(G) \xrightarrow{Nodes\ compromised} G^p :: V_r \supseteq \eta \qquad \text{Equation (2)}$$

The core resilience $\mathfrak{R}$ may then be defined by employing a Tau b-rank coefficient for the η nodes in Equation (3).

From Equation (1) the activated core may be defined as $\langle G_{\theta\ \mho}^n \rangle^{Ac}$, where 'Ac' is the activated core.

$$R_\eta^\rho(G) = \tau_b(u, G^p : u \subset V_r) \qquad \text{Equation (3)}$$

It should be noted that the resiliency is determined for a plurality, e.g., at least two, a majority, all, etc., of the nodes of the internet-based network, and therefore a vector multiple hypothesis is established to represent a plurality of the nodes. More specifically, in Equations (1-2), the nodes of the internet-based network are manipulated to determine the ACA of the internet-based network. For example, manipulating the nodes of the internet-based network to determine the ACA of the internet-based network in some approaches includes randomly partitioning the internet-based network into micro-segments of nodes. For example, a first of such micro-segments may include the first group of nodes, a second of such micro-segments may include the second group of nodes, a third of such micro-segments may include a third group of nodes, etc. A result of Equations (1-2) filters out nodes that are determined to be not favorable for establishing a resilient portion of the internet-based network. This is because consideration of these nodes in microsegments reveals that the nodes do not contribute to retention of affluence among the nodes of the internet-based network throughout losses of connection. Accordingly, the nodes are filtered out. Moving to Equation (3) from Equations (1-2), the nodes of the internet-based network that are not filtered out are used to build a vector multiple hypothesis based on the partitioning. More specifically, the vector multiple hypothesis, e.g., see Vr, which is now based on a vector construct rather than a node construct, indicates a resilience of nodes of the internet-based network which is based on a tau rank coefficient. Furthermore, the tau operator of Equation (3) takes into account the nodes "u" and the graph which is partitioned. Note that portions of the graph that are specifically considered are those that represent the nodes "u" that have not experienced a change in ranking based on a loss of connection based on the manipulations. This results in only the "u" which belong to the "Vr" being used, and this part of the graph is what is partitioned. The vector is defined by making n-dimensions of resiliency calculations on a node basis and then defining and maintaining the results as a vector, e.g., see Equation (3).

The (η, $\rho_i$, $\rho_u$) may be defined as the ACA, and the core resilience of the internet-based network as the mean (η, ρ)-core resilience as ρ is varied from $\rho_i$ to $\rho_u$. The (η, $\rho_i$, $\rho_u$)-core resilience of "G" may be denoted in the $\mathfrak{R}$ notation, using Equation (2) as Equation (4).

$$R_\eta^{\rho_i,\rho_u}(G) = \frac{\int_{\rho_i}^{\rho_u} R_\eta^{\rho_i,\rho_u}(G)}{\rho_u - \rho_i} \qquad \text{Equation (4)}$$

The ACA of a node is a measure of how likely the ranking of the remaining nodes that were not filtered out using Equations 1-2, e.g., the activated core number, will decrease when edges are masked from the network.

With continued reference to the ACA, in some approaches one node "u" in the internet-based network may be identified. A traversal may be made from the node "u" and to a neighboring node in one direction, and it may be determined if the neighbors of the node "u" are: less affluent than "u,"

equally as affluent as "u," or more affluent than "u." This ensures each of the remaining nodes that were not filtered out using Equations 1-2 is connected to at least one neighbor that increases the affluency of "u."

A set of nodes may then be defined which has at least one node as a neighbor which increases the affluence of the node "u." Finally, the ACA of all the nodes u is defined taking into account all the neighboring nodes which are determined to be responsible for increasing the affluence of the node "u."

K(u,G) and ζ(u,g) may represent the ranking (core number) and set of neighbors of u in G (respectively) for purposes of an example. The neighbors of the node "u" are split into three sets as illustrated in Equation (5), e.g., see first three lines of Equation (5).

$$\Delta_<(u,G)=\{v:v\in\zeta(u,g)\wedge K(v,G)<K(u,G)\}$$

$$\Delta_=(u,G)=\{v:v\in\zeta(u,g)\wedge K(v,G)=K(u,G)\}$$

$$\Delta_>(u,G)=\{v:v\in\zeta(u,g)\wedge K(v,G)>K(u,G)\}$$

$$\Delta_\geq(u,G)=\Delta_=(u,G)\cup\Delta_>(u,G) \quad \text{Equation (5)}$$

A set $V_\delta$ of nodes is also defined where each node $u\in V_\delta$ has at least one neighbor node, v, with a larger ranking (core number), e.g., K(u,G)<K(v,G), as, Equation (6). Note that for the other sets K(u,G)=K(v,G) and K(u,G)>K(v,G), the nodes may not be connected with at least one neighbor node that results in the node maintaining the ranking of the node. Accordingly, the first set is used, e.g., see below.

$$V_\delta=\{u:u\in V\wedge|\Delta_=(u,G)I<K(u,G)\} \quad \text{Equation (6)}$$

For context, the ACA of node u indicates the minimum number of u's neighbors that when disconnected cause u's assigned ranking, e.g., core number, to decrease. The ACA of u is denoted by $\mathfrak{R}_\eta^{(u,G)}$ below. For all nodes u in internet-based network G, the ranking (core number) of u is based on connections to $\Delta_\geq(u,G)$. Thus, the ACA of node $u\in G$ is in some approaches given by Equation (7).

$$\mathfrak{R}_\eta^{(u,G)}=|\Delta_\geq(u,G)|-K(u,G)+1 \quad \text{Equation (7)}$$

The ACA of a node 'u' furthermore describes how likely the node is to retain the ranking assigned to the node, e.g., core number, when the node loses connections. For example, a node with a relatively high ACA has a relatively greater number of redundant connections and therefore is less likely to experience a drop in ranking (core number) if the node's connections are lost, non-confirmatory, non-conforming, etc. A congregation of nodes with relatively high ACA infer a high likelihood of resiliency in the considered network. Note that an internet-based network may be determined to include a plurality of such congregations of nodes which infers a relatively more resilient internet-based network than another internet-based network that includes one or no such congregation of nodes. Furthermore, the nodes of such a congregation may maintain rankings (core numbers) as a result of the nodes not shutting off while other nodes of the internet-based network that do not maintain rankings as a result of the other nodes shutting off. For example, with reference again to the example in which the internet-based network includes five nodes, in response to a determination that the second node maintains the ranking of three, it may be determined that the internet-based network includes three other nodes that maintain connections despite portions of the internet-based network being shut off. These nodes that maintain these connections are preferably included in the activated core of nodes because they are resilient nodes that can be relied on to maintain affluence within the internet-based network. More specifically, the nodes that do not shut off can be relied on for establishing a reliable connection, e.g., affluence, between at least two devices of the internet-based network. This maintained affluency is enabled as a result of each of the nodes of the activated core being connected to at least one other node of the activated core. Accordingly, in some preferred approaches, such a congregation of nodes with a relatively high ACA are included the activated core of nodes in the resilient portion of the network, e.g., see operation 306 of method 300. As mentioned elsewhere herein, at least some of the nodes of the internet-based network may be non-obligatory nodes. It should be noted that, at least some of the nodes of the activated core may be non-obligatory nodes in some approaches. However, these non-obligatory nodes may be relied on for maintaining connections during performance of a communication operation because the nodes of the activated core have been proven from the loss of connection testing described elsewhere above to retain resiliency along a communication path of the internet-based network.

Operation 308 includes determining some of the nodes of the internet-based network that do not retain connection with one or more other nodes upon the one or more groups of the nodes, e.g., such as the first group of the nodes, at least temporarily losing connection. These nodes may be determined to be nodes with a relatively low ACA. These nodes have a relatively low or no number of redundant connections and therefore experience a drop in ranking (core number) in the event that the connections are lost, non-confirmatory, non-conforming, etc. A congregation of nodes with relatively low ACA infer a low likelihood of resiliency in the considered network. Accordingly, in some preferred approaches, such a congregation of nodes with a relatively low ACA are excluded from the activated core of nodes in the resilient portion of the network, e.g., see operation 310 of method 300. Note that in some approaches, in response to a determination that each of nodes have a relatively low ACA, it may be determined that the internet-based network is not resilient, and the internet-based network is therefore no relied on for performing a communication operation between a first device and a second device.

The nodes of the activated core may be used in a communication operation between a first internet-based device and a second internet-based device of the internet-based network, e.g., see operation 312. Note that in some approaches, the some of the nodes excluded from the activated core are not used in the communication operation.

Various benefits are enabled as a result of implementing the techniques described in various embodiments and approaches described herein in an internet-based network. A resilient portion of a network that includes an activated core of the nodes has not been determined based on an ACA in conventional techniques. More specifically, the novel techniques described in various embodiments and approaches described herein include enablement of an ACA which allows the hypothesis of a core resiliency to be tested in a non-obligatory network in presence of non-confirmatory nodes. Furthermore, a network resilience construct is enabled which establishes a method to check the effect of random masking of parts of network on an individual node. Yet furthermore, novel techniques are enabled by randomly partitioning the network into micro segment such that a vector multiple hypothesis referring to core resilience of the network is enabled to be built. In sharp contrast, conventional techniques fail to provide a framework to obtain an activated core in an internet-based network with the presence of non-confirmatory nodes, much less one that is based on a network resilience construct and/or an activated core affluence (ACA). Accordingly, the inventive discoveries disclosed herein proceed contrary to conventional wisdom.

The various benefits that are enabled as a result of implementing the techniques described in various embodiments and approaches described herein further include improvements to the functioning of computer related devices of an internet-based network. For example, the framework described in various embodiments and approaches described herein to obtain an activated core in an internet-based network maintains communication connections among non-confirmatory nodes in an internet-based network. Because these connections are maintained, overhead is decreased, which results in an increased efficiency and reliability in the connections among nodes in the internet-based network.

Figure 4:
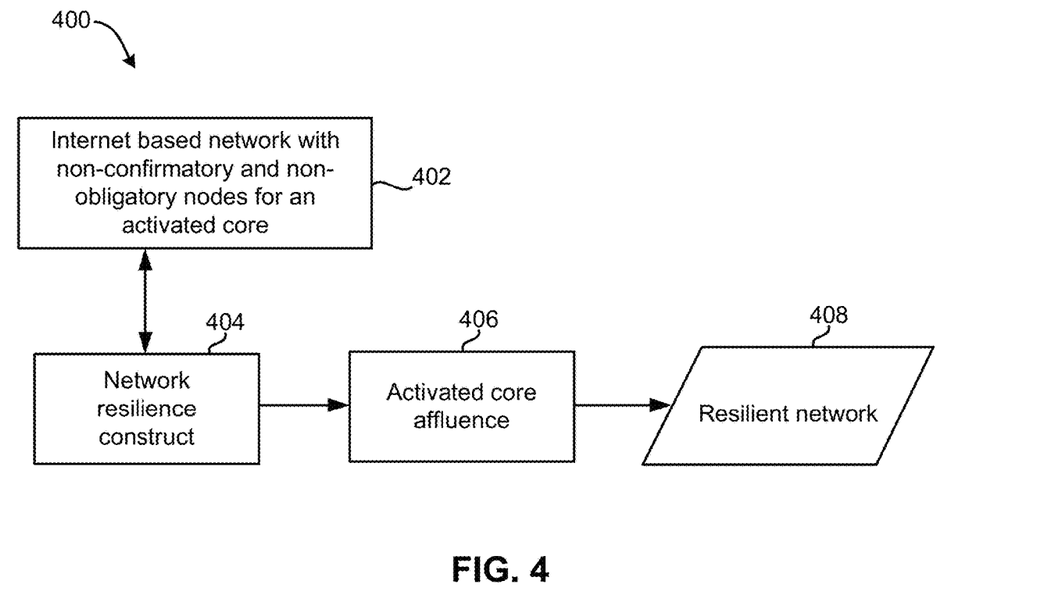
FIG. 4 is an architecture, in accordance with one embodiment.

FIG. 4 depicts an architecture 400, in accordance with one embodiment. As an option, the present architecture 400 may be implemented in conjunction with features from any other embodiment listed herein, such as those described with reference to the other FIGS. Of course, however, such architecture 400 and others presented herein may be used in various applications and/or in permutations which may or may not be specifically described in the illustrative embodiments listed herein. Further, the architecture 400 presented herein may be used in any desired environment.

The architecture 400 includes an internet-based network 402 with non-confirmatory and non-obligatory nodes for an activated core. A network resilience construct 404 of the internet-based network may be defined using techniques similar to those described elsewhere above, e.g., see operation 302 of method 300.

With continued reference to FIG. 4, nodes of the internet-based network 402 may be manipulated to determine an ACA 406 of the internet-based network 402. Furthermore, a resilient portion of the network, e.g., see resilient network 408, that includes an activated core of the nodes may be determined based on the ACA.

Figure 5A:
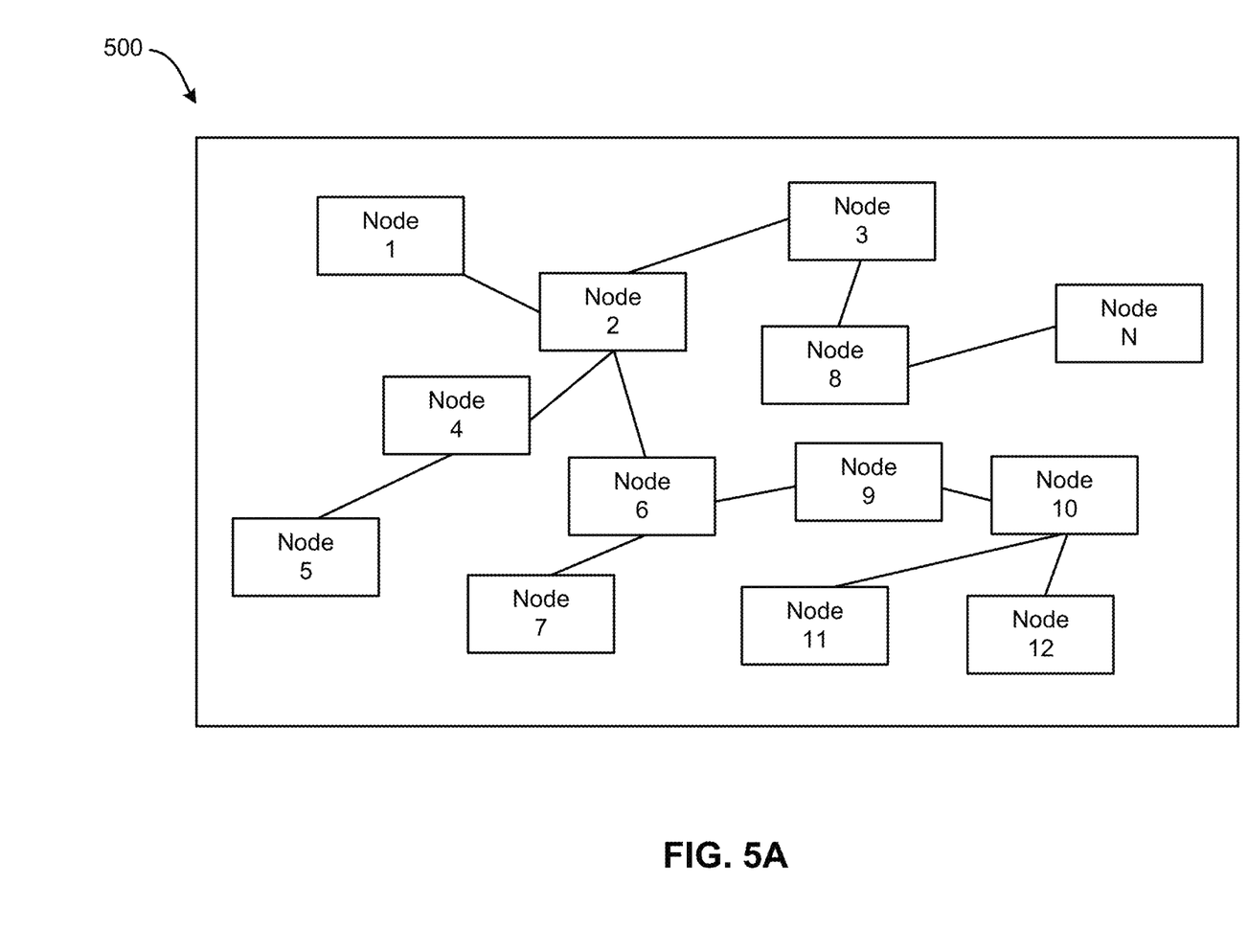
FIGS. 5A-5C depict the progression of a process of determining a resilient portion of a network, in accordance with one embodiment.
Figure 5B:
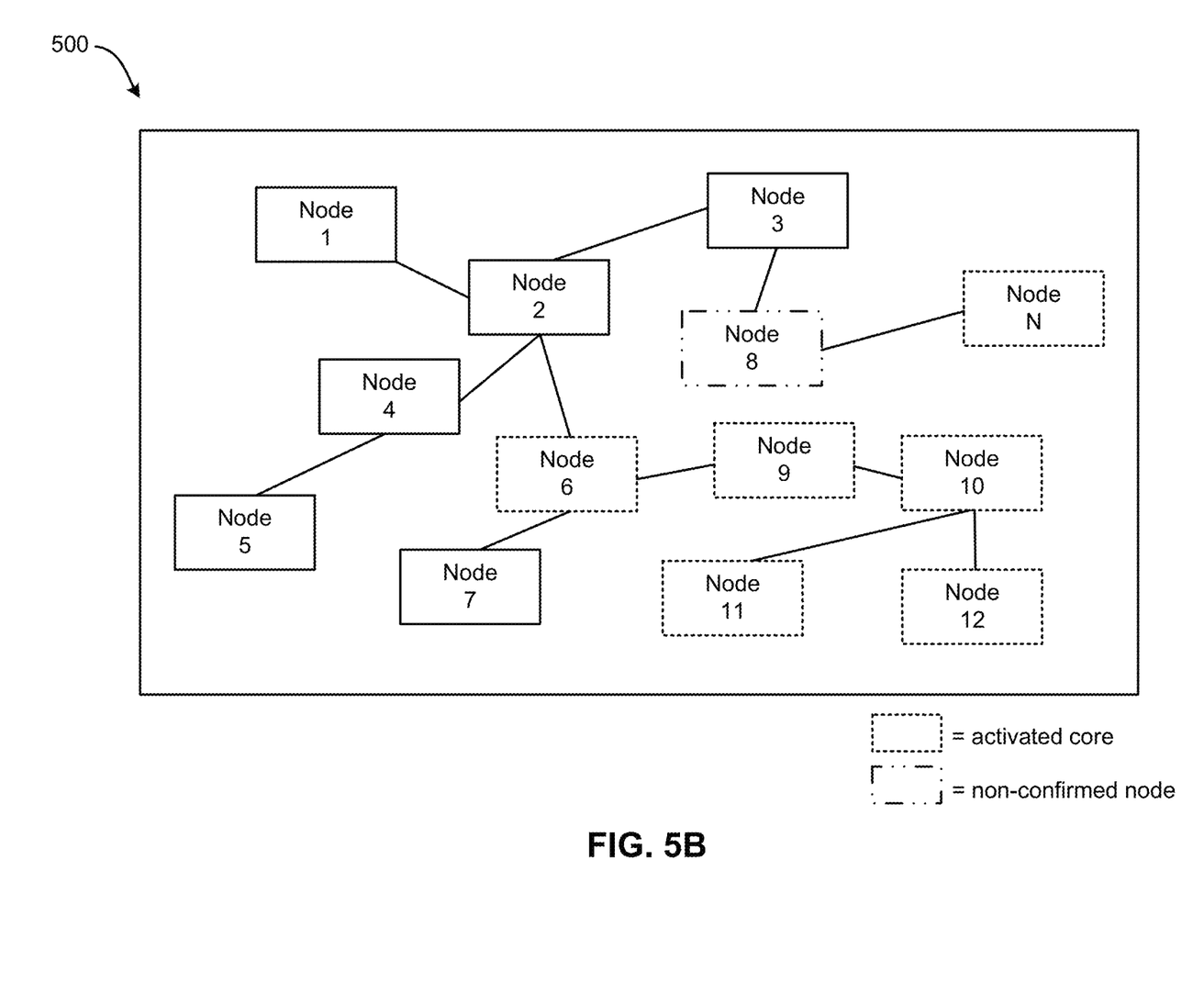
Figure 5C:
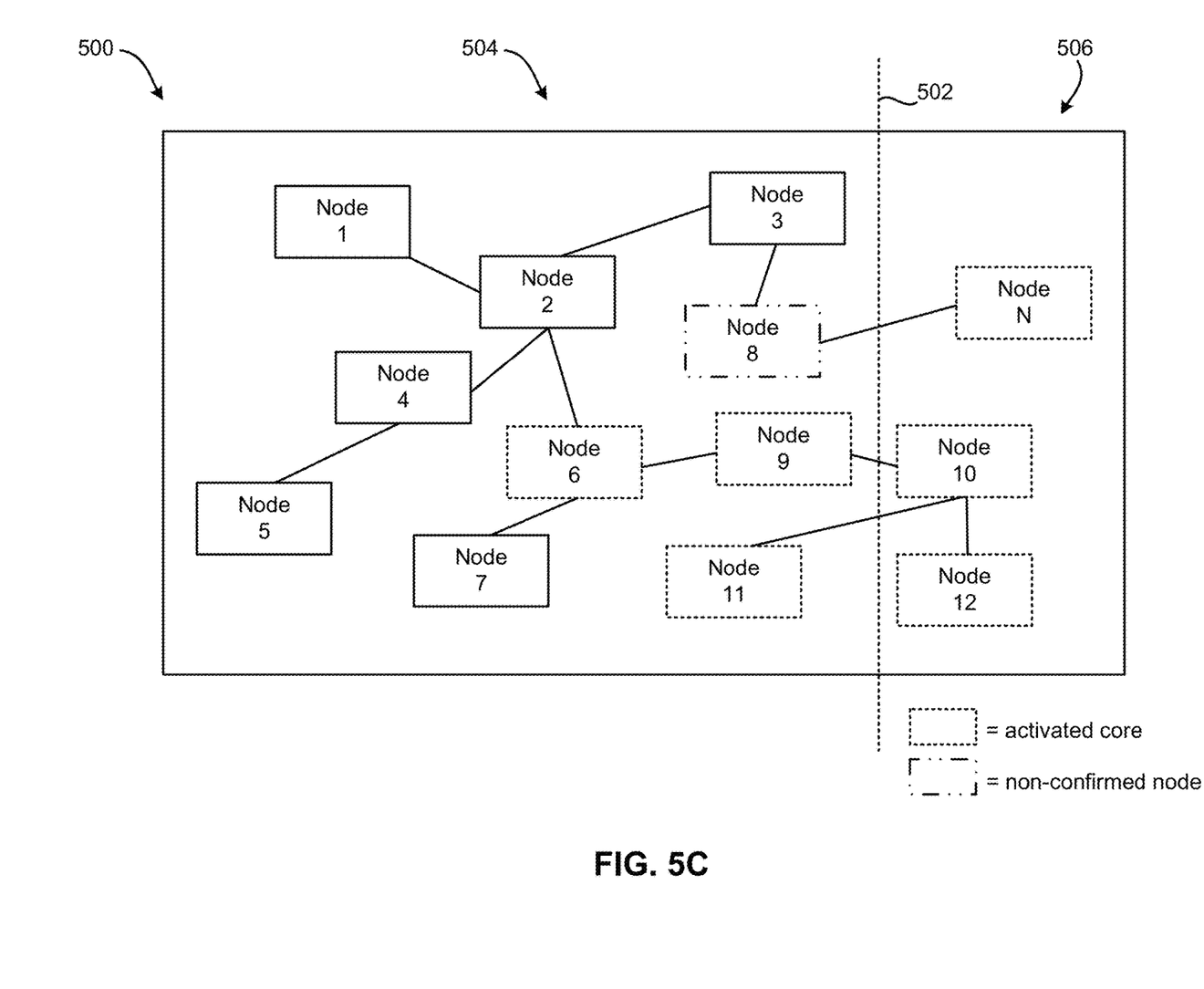

FIGS. 5A-5C depict an internet-based network 500, in accordance with one embodiment. As an option, the present internet-based network 500 may be implemented in conjunction with features from any other embodiment listed herein, such as those described with reference to the other FIGS. Of course, however, such internet-based network 500 and others presented herein may be used in various applications and/or in permutations which may or may not be specifically described in the illustrative embodiments listed herein. Further, the internet-based network 500 presented herein may be used in any desired environment.

Referring first to FIG. 5A, the internet-based network 500 includes a plurality of IoT devices, e.g., see Node 1, Node 2, Node 3, Node 4, Node 5, Node 6, Node 7, Node 8, Node 9, Node 10, Node 11, Node 12, and Node N.

Referring to FIG. 5B, an activated core, e.g., see Node 6, Node 9, Node 11, Node N, Node 10, Node 12, with a non-confirmed node, e.g., see Node 8, is determined.

In FIG. 5C, a metric of an ACA is assigned to nodes of the internet-based network 500. For example, a ranking (core number ranking) is assigned to each of the nodes of the activated core. Thereafter a ρ % of edges or nodes of the internet-based network are randomly removed. For example, line 502 delineates a first group 504 of the nodes that are not removed, and a second group 506 of the nodes that are randomly removed from the internet-based network 500. A resilient portion of the network that includes an activated core of the nodes may be determined based on the ACA.

Figure 6A:
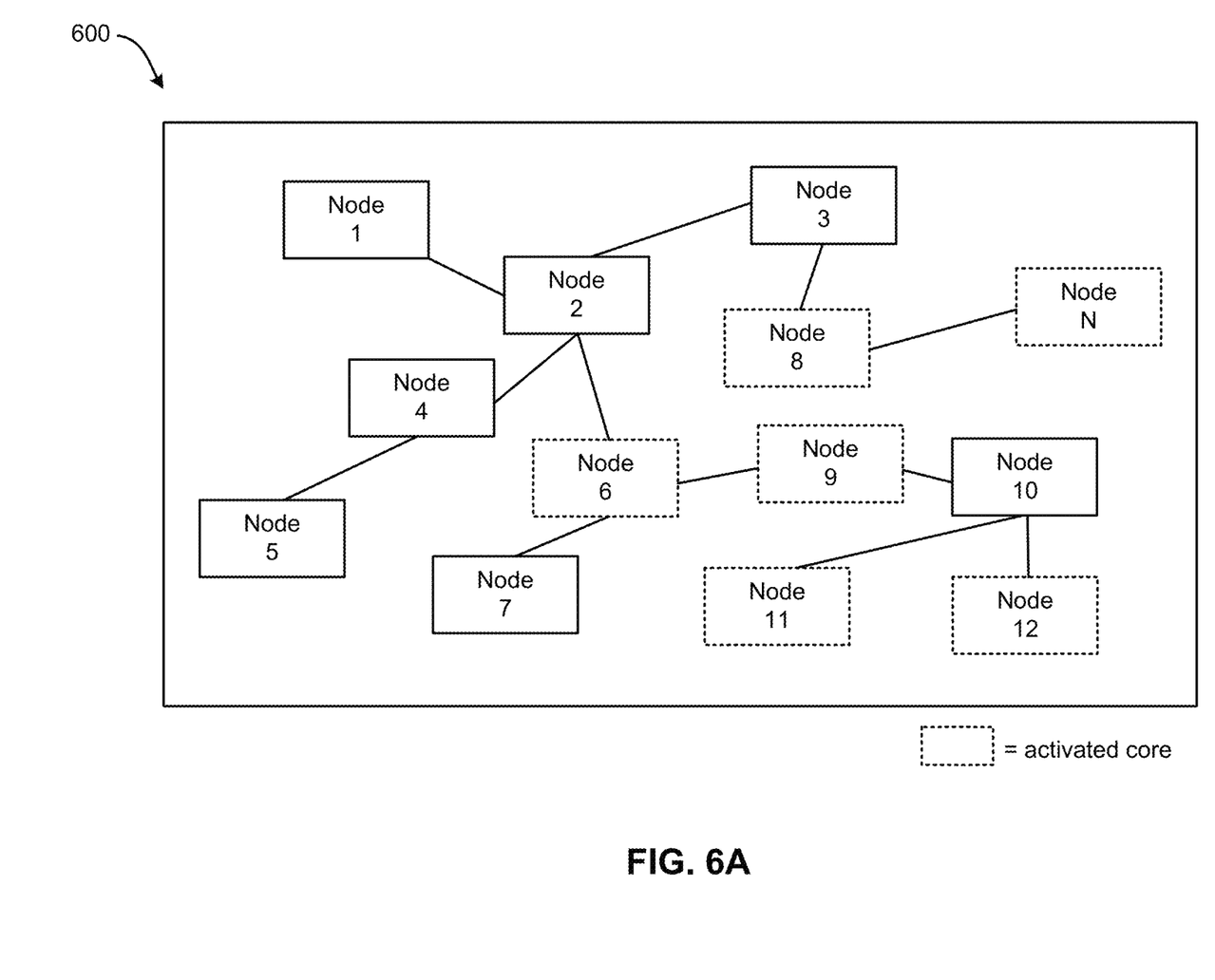
FIGS. 6A-6B depict the progression of a process of determining a resilient portion of a network, in accordance with one embodiment.
Figure 6B:
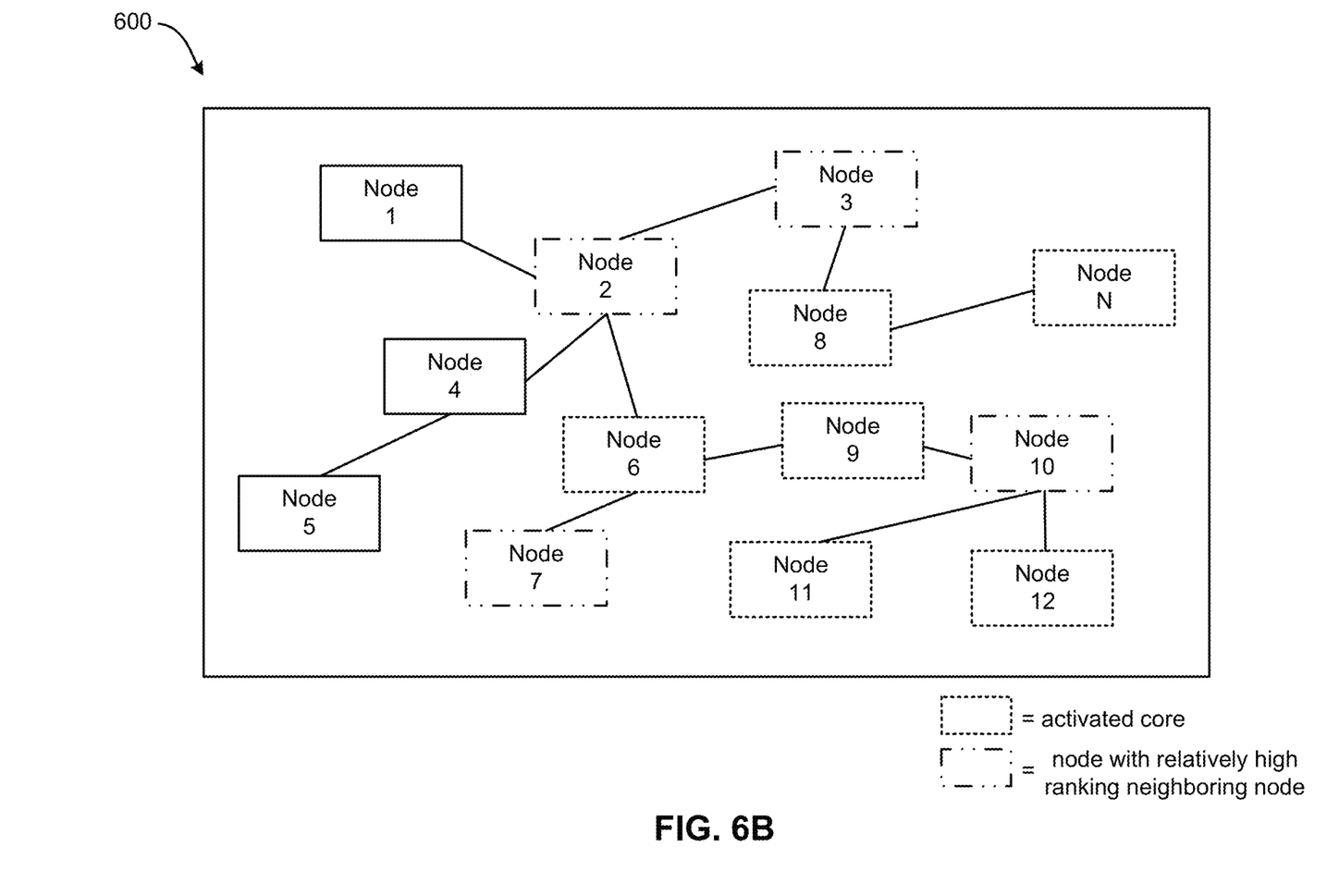

FIGS. 6A-6B depict an internet-based network 600, in accordance with one embodiment. As an option, the present internet-based network 600 may be implemented in conjunction with features from any other embodiment listed herein, such as those described with reference to the other FIGS. Of course, however, such internet-based network 600 and others presented herein may be used in various applications and/or in permutations which may or may not be specifically described in the illustrative embodiments listed herein. Further, the internet-based network 600 presented herein may be used in any desired environment.

Referring first to FIG. 6A, the internet-based network 600 includes a plurality of nodes, e.g., see Node 1, Node 2, Node 3, Node 4, Node 5, Node 6, Node 7, Node 8, Node 9, Node 10, Node 11, Node 12, and Node N, which may be one or more known types of devices. Nodes that are members of an activated core, e.g., see Node 6, Node 8, Node 9, Node 11, Node N, Node 12, are associated with rankings, e.g., assigned a core number. One node at a time may be picked, and a traversal may be made to check the ranking of neighboring nodes. For example, referring to FIG. 6B, nodes with relatively high ranking neighbor nodes are identified, e.g., see Node 2, Node 3, Node 7, and Node 10. An ACA $\mathfrak{R}_\eta^{(u,G)}$ may be determined, e.g., using the techniques described in method 300. In some approaches the ACA describes how likely a node is to retain a ranking when the node loses connections. A resilient portion of the network that includes an activated core of the nodes may be determined based on the ACA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
defining a network resilience construct of an internet-based network, wherein the network resilience construct includes rankings for nodes of the internet-based network;
manipulating the nodes of the internet-based network by causing a temporary masking and an unmasking of groups of the nodes to determine an Activated Core Affluence (ACA) of the internet-based network, wherein the ACA defines a likelihood, for each node, of retaining the ranking for the node upon a first group of the nodes losing connection with the internet-based network; and
determining, based on the ACA, a resilient portion of the network that includes an activated core of the nodes, wherein the nodes of the activated core retain connection with one or more other nodes of the internet-based network upon the first group of the nodes losing connection.

2. The computer-implemented method of claim 1, wherein manipulating the nodes of the internet-based network by causing the temporary masking and the unmasking of groups of the nodes to determine the ACA of the internet-based network includes:
masking a first group of the nodes from the internet-based network,
determining an effect that the masking has on the rankings of a second group of the nodes, and
unmasking the first group of the nodes.

3. The computer-implemented method of claim 2, wherein the first group of the nodes are masked from the internet-based network randomly during operation of the internet-based network, wherein temporarily masking the first group of the nodes results in the first group of the nodes being temporarily excluded from the internet-based network while the remaining nodes of the internet-based network remain included in the internet-based network, wherein the first group of the nodes are again included in the internet-based network as a result of unmasking the first group of the nodes.

4. The computer-implemented method of claim 1, wherein manipulating the nodes of the internet-based network by causing the temporary masking and the unmasking of groups of the nodes to determine the ACA of the internet-based network includes randomly partitioning the internet-based network into micro-segments; and building a vector multiple hypothesis based on the partitioning, wherein the vector multiple hypothesis indicates a resilience of the internet-based network.

5. The computer-implemented method of claim 1, comprising:
determining some of the nodes of the internet-based network that do not retain connection with one or more other nodes upon the first group of the nodes losing connection; and
excluding the some of the nodes from the activated core.

6. The computer-implemented method of claim 5, comprising: using the nodes of the activated core in a communication operation between a first internet-based device and a second internet-based device, wherein the some of the nodes excluded from the activated core are not used in the communication operation.

7. The computer-implemented method of claim 1, wherein each of the nodes of the activated core are connected to at least one other node of the activated core.

8. A system, comprising:
a processor; and
logic integrated with the processor, executable by the processor, or integrated with and executable by the processor, the logic being configured to:
define a network resilience construct of an internet-based network, wherein the network resilience construct includes rankings for nodes of the internet-based network;
manipulate the nodes of the internet-based network to determine an Activated Core Affluence (ACA) of the internet-based network, wherein the ACA defines a likelihood, for each node, of retaining the ranking for the node upon a first group of the nodes losing connection with the internet-based network, wherein manipulating the nodes of the internet-based network to determine the ACA of the internet-based network includes randomly partitioning the internet-based network into micro-segments; and building a vector multiple hypothesis based on the partitioning, wherein the vector multiple hypothesis indicates a resilience of the internet-based network; and
determine based on the ACA, a resilient portion of the network that includes an activated core of the nodes, wherein the nodes of the activated core retain connection with one or more other nodes of the internet-based network upon the first group of the nodes losing connection.

9. The system of claim 8, wherein manipulating the nodes of the internet-based network to determine the ACA of the internet-based network includes:
masking a first group of the nodes from the internet-based network, and
determining an effect that the masking has on the rankings of a second group of the nodes.

10. The system of claim 9, wherein the first group of the nodes are masked from the internet-based network randomly during operation of the internet-based network.

11. The system of claim 8, the logic being configured to:
determine some of the nodes of the internet-based network that do not retain connection with one or more other nodes upon the first group of the nodes losing connection; and
exclude the some of the nodes from the activated core.

12. The system of claim 11, the logic being configured to: use the nodes of the activated core in a communication operation between a first internet-based device and a second internet-based device, wherein the some of the nodes excluded from the activated core are not used in the communication operation.

13. A computer program product, the computer program product comprising a computer readable storage medium having program instructions embodied therewith, the program instructions readable and/or executable by a computer to cause the computer to:
define, by the computer, a network resilience construct of an internet-based network, wherein the network resilience construct includes rankings for nodes of the internet-based network;
manipulate, by the computer, the nodes of the internet-based network by causing a temporary masking and an unmasking of groups of the nodes to determine an Activated Core Affluence (ACA) of the internet-based network, wherein the ACA defines a likelihood, for each node, of retaining the ranking for the node upon a first group of the nodes losing connection with the internet-based network; and determine, by the computer, based on the ACA, a resilient portion of the network that includes an activated core of the nodes, wherein the nodes of the activated core retain connection with one or more other nodes of the internet-based network upon the first group of the nodes losing connection.

14. The computer program product of claim 13, wherein manipulating the nodes of the internet-based network by causing the temporary masking and the unmasking of groups of the nodes to determine the ACA of the internet-based network includes:

masking a first group of the nodes from the internet-based network, determining an effect that the masking has on the rankings of a second group of the nodes, and unmasking the first group of the nodes.

15. The computer program product of claim 14, wherein the first group of the nodes are masked from the internet-based network randomly during operation of the internet-based network.

16. The computer program product of claim 13, wherein manipulating the nodes of the internet-based network by causing the temporary masking and the unmasking of groups of the nodes to determine the ACA of the internet-based network includes randomly partitioning the internet-based network into micro-segments; and building a vector multiple hypothesis based on the partitioning, wherein the vector multiple hypothesis indicates a resilience of the internet-based network.

17. The computer program product of claim 13, the program instructions readable and/or executable by the computer to cause the computer to:

determine, by the computer, some of the nodes of the internet-based network that do not retain connection with one or more other nodes upon the first group of the nodes losing connection; and exclude, by the computer, the some of the nodes from the activated core.

18. The computer program product of claim 17, the program instructions readable and/or executable by the computer to cause the computer to: use, by the computer, the nodes of the activated core in a communication operation between a first internet-based device and a second internet-based device, wherein the some of the nodes excluded from the activated core are not used in the communication operation.

19. The computer program product of claim 13, wherein each of the nodes of the activated core are connected to at least one other node of the activated core.

* * * * *